United States Patent [19]
Shiono et al.

[11] Patent Number: 5,561,558
[45] Date of Patent: Oct. 1, 1996

[54] DIFFRACTIVE OPTICAL DEVICE

[75] Inventors: Teruhiro Shiono, Osaka; Hisahito Ogawa, Nara-ken, both of Japan

[73] Assignee: Matsushita Electric Industrial Co., Ltd., Kadoma, Japan

[21] Appl. No.: 323,927

[22] Filed: Oct. 17, 1994

[30] Foreign Application Priority Data

Oct. 18, 1993 [JP] Japan .................... 5-259639
Oct. 18, 1993 [JP] Japan .................... 5-259640

[51] Int. Cl.⁶ .................... G02B 27/42; G02B 5/18
[52] U.S. Cl. .................... 359/569; 359/565; 359/572
[58] Field of Search .................... 359/565, 566, 359/569, 572, 576

[56] References Cited

U.S. PATENT DOCUMENTS

| | | |
|---|---|---|
| 4,400,057 | 8/1983 | Moraw et al. |
| 4,936,665 | 6/1990 | Whitney .................... 359/565 |
| 5,073,007 | 12/1991 | Kedmi et al. .................... 359/565 |
| 5,218,471 | 6/1993 | Swanson et al. .................... 359/565 |
| 5,227,915 | 7/1993 | Grossinger et al. .................... 359/569 |
| 5,283,690 | 2/1994 | Miyake et al. .................... 359/575 |
| 5,315,676 | 5/1994 | Sunagawa .................... 359/575 |
| 5,377,044 | 12/1994 | Tonono et al. .................... 359/576 |

FOREIGN PATENT DOCUMENTS

| | | |
|---|---|---|
| 0431527 | 6/1991 | European Pat. Off. |
| 3536497 | 4/1986 | Germany . |
| 276740 | 11/1988 | Germany .................... 359/576 |
| 62-296102 | 12/1987 | Japan . |
| 91/12543 | 8/1991 | WIPO . |

OTHER PUBLICATIONS

H. Haidner et al., "Design of a Blazed Grating Consisting of Metallic Subwavelength Binary Grooves", *Optics Communications*, pp. 5–10 vol. 98, No. 1–3 (Apr. 15, 1993).

J. Jahns et al., "Two–dimensional array of diffractive microlenses fabricated by thin film deposition", *Applied Optics*, vol. 29, No. 7, pp. 931–936 (Mar. 1990).

M. W. Farn, "Binary gratings with increased efficiency", *Applied Optics*, vol. 31, No. 22, pp. 4453–4458 (Aug. 1992).

*Primary Examiner*—Jon W. Henry
*Attorney, Agent, or Firm*—Ratner & Prestia

[57] ABSTRACT

A diffractive optical device includes a substrate for allowing transmission therethrough of light to be diffracted; and a grating section located on the substrate and including a plurality of grating elements each having multiple discrete phase levels. The plurality of grating elements are arranged at different grating periods in different areas of a surface of the substrate and have the phase levels in different numbers in accordance with the grating period.

19 Claims, 18 Drawing Sheets

Level number : 2

Level number : 4

DIFFRACTIVE OPTICAL DEVICE

BACKGROUND OF THE INVENTION

1. Field of the Invention

The present invention relates to a diffractive optical device, especially a diffractive optical device preventing reduction in the diffraction efficiency even in an area having a small grating period.

2. Description of the Related Art

A diffractive optical device, which utilizes diffraction of light, has a grating pattern for diffraction. The grating pattern is formed by arranging a plurality of grating elements on a substrate. The diffraction efficiency, which is the ratio of light which can be diffracted with respect to the light incident on the diffractive optical device, is determined by the grating pattern. Generally, how high the diffraction efficiency can be is a matter of a prime importance in determining the quality of the diffractive optical device.

One of conventional diffractive optical devices is a diffractive microlens used for diffracting light which is incident thereon vertically. Briefly referring to FIGS. 1 and 2, such a conventional diffractive microlens 100 will be described. FIG. 1 is a plan view of the microlens 100 illustrating a grating pattern thereof, and FIG. 2 is a cross sectional view of the microlens 100. The microlens 100 includes a substrate 11. Light which is incident vertically on a bottom surface of the substrate 11 is collected or collimated above the substrate 11. As is shown in FIG. 1, a plurality of grating elements 18 are arranged concentrically on a top surface of the substrate 11 to form a grating pattern. A period at which the grating elements 18 are arranged (hereinafter, referred to as a "grating period") becomes progressively smaller toward the outer periphery of the substrate 11. As is shown in FIG. 2, each grating element 18 has a rectangular cross section.

FIG. 3 is a cross sectional view of another diffractive microlens 200 proposed by J. Jahns and S. J. Walker in "Two-dimensional array of diffractive microlenses fabricated by thin film deposition", Applied Optics Vol. 29, No. 7, pp. 931–936 (1990). The microlens 200 includes a substrate 11 and a plurality of grating elements 28 arranged on a top surface of the substrate 11. Each grating element 28 has multiple discrete phase levels. In the example shown in FIG. 3, each grating element 28 has four phase levels including the top surface of the substrate 11. Adopting such a way of counting, each grating element 18 in the microlens 100 in FIG. 2 has two phase levels. This way of counting the phase levels of the grating elements will be used throughout this specification.

While the diffractive microlens 100 has a diffraction efficiency of 41%, the microlens 200 has a diffraction efficiency of as high as 81%. It has been found that the larger the number of phase levels of the grating element is, the higher the diffraction efficiency is. For example, the diffraction efficiency is 95% where each grating element has eight phase levels, and the diffraction efficiency is 99% where each grating element has 16 phase levels.

Considering the above-described relationship between the diffraction efficiency and the number of phase levels, it is easily assumed that any type of diffractive optical devices show such relationship.

In the case that light is incident at an angle which is offset with respect to the vertical direction to the substrate, it is true that the larger the number of phase levels is, the higher the diffraction efficiency is in an area where the grating period is relatively large. The researchers including the inventors of the present invention have found that the diffraction efficiency is significantly reduced as the number of the phase levels is increased in an area where the grating period is relatively small, namely, proximate to the wavelength of the incident light.

Further, in an area where the grating period is small, precision processing is difficult to perform. Accordingly, it is substantially impossible to process the grating elements into a desirable shape, which reduces the optical characteristics of the diffractive optical device.

SUMMARY OF THE INVENTION

One aspect of the present invention relates to a diffractive optical device including a substrate for allowing transmission therethrough of light to be diffracted; and a grating section located on the substrate and including a plurality of grating elements each having multiple discrete phase levels. The plurality of grating elements are arranged at different grating periods in different areas of a surface of the substrate and have the phase levels in different numbers in accordance with the grating period.

In one embodiment of the invention, the number of the phase levels becomes progressively smaller in accordance with decrease in the grating period.

In one embodiment of the invention, the number of the phase levels is at least 3 in an area where the grating period is at least a first value obtained by multiplying a wavelength of the light by a first prescribed number. The number of the phase levels is 2 in an area where the grating period is less than the first value. The first prescribed number is substantially between 1.5 and 3.

In one embodiment of the invention, the grating section has a duty ratio of substantially between 0.15 and 0.5 in the area where the grating period is less than the first value.

In one embodiment of the invention, the number of the phase levels is at least 4 in an area where the grating period is at least a second value obtained by multiplying the wavelength of the light by a second prescribed number. The number of the phase levels is 3 in an area where the grating period is smaller than the second value and at least the first value. The second value is substantially between 2 and 5 and greater than the first prescribed number.

In one embodiment of the invention, the number of the phase levels is at least 5 in an area where the grating period is at least a third value obtained by multiplying the wavelength of the light by a third prescribed number. The number of the phase levels is 4 in an area where the grating period is smaller than the third value and at least the second value. The third value is substantially between 4 and 7 and greater than the second prescribed number.

In one embodiment of the invention, the grating elements have different heights in accordance with the number of the phase levels thereof.

In one embodiment of the invention, the bottommost level among the multiple discrete phase levels is the surface of the substrate.

In one embodiment of the invention, the smallest grating period is greater than ½n of the wavelength of the light where n is the refractive index of the substrate, and the duty ratio of the grating section changes in accordance with the grating period.

In one embodiment of the invention, the grating elements are symmetrically arranged with respect to the center thereof and are arcked in an identical direction, and the grating period becomes progressively smaller in the direction.

In one embodiment of the invention, the plurality of grating elements are extended in straight lines in an identical direction, and the grating period changes in a direction which is perpendicular to the direction in which the grating elements are extended.

In one embodiment of the invention, the grating section is covered with a thin film.

In one embodiment of the invention, the thin film is reflective.

In one embodiment of the invention, the thin film is non-reflective.

In one embodiment of the invention, the substrate includes a light guide region for propagating the light.

Another aspect of the present invention relates to a diffractive optical device including a substrate for allowing transmission therethrough of light to be diffracted; and a grating section located on the substrate and including a plurality of grating elements. The plurality of grating elements are arranged at different grating periods in different areas of a surface of the substrate. The smallest grating period is greater than ½n of the wavelength of the light where n is the refractive index of the substrate. The grating section has a duty ratio changing in accordance with the grating period.

In one embodiment of the invention, the duty ratio is less than 0.5 in an area where the grating period is less than three to four times the wavelength of the light.

In one embodiment of the invention, the duty ratio becomes progressively smaller in accordance with decrease in the grating period.

In one embodiment of the invention, the plurality of grating elements have different heights in accordance with the grating period.

In one embodiment of the invention, the height of the plurality of grating elements becomes progressively smaller in accordance with decrease in the grating period in an area where the grating period is less than three to four times the wavelength of the light.

In one embodiment of the invention, a part of the plurality of grating elements each have at least three discrete phase levels.

Thus, the invention described herein makes possible the advantages of providing a diffractive optical device which has a high diffraction efficiency in the entire area thereof for the light which is incident thereon at an angle offset with respect to the vertical direction thereto and which has grating elements easily fabricated even with a small grating period.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
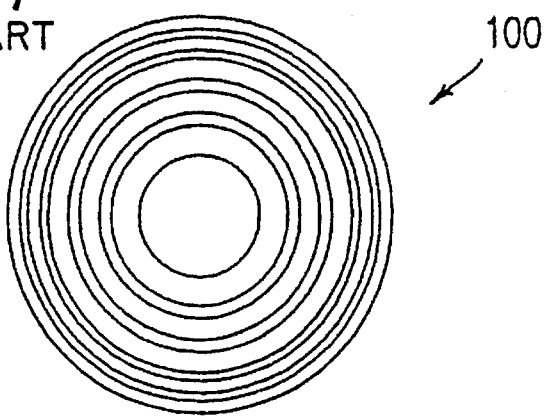
FIG. 1 is a plan view of a conventional diffractive optical device for diffracting light which is incident vertically thereto.
Figure 2:
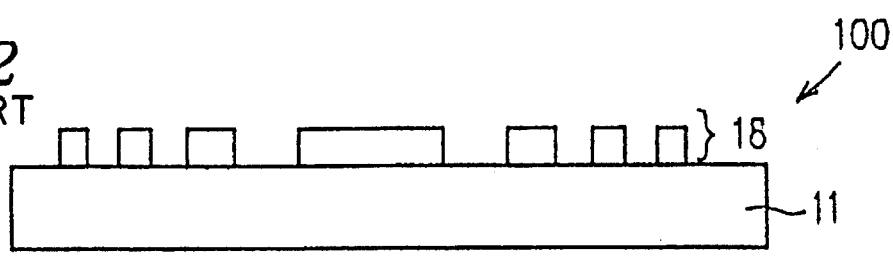
FIG. 2 is a cross sectional view of the conventional diffractive optical device shown in FIG. 1.
Figure 3:
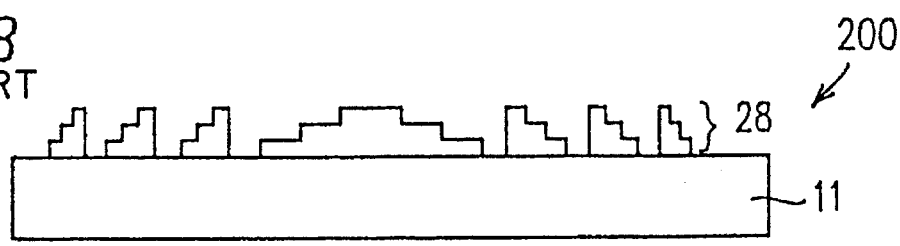
FIG. 3 is a cross sectional view of another conventional diffractive optical device for diffracting light which is incident vertically thereto.
Figure 4:
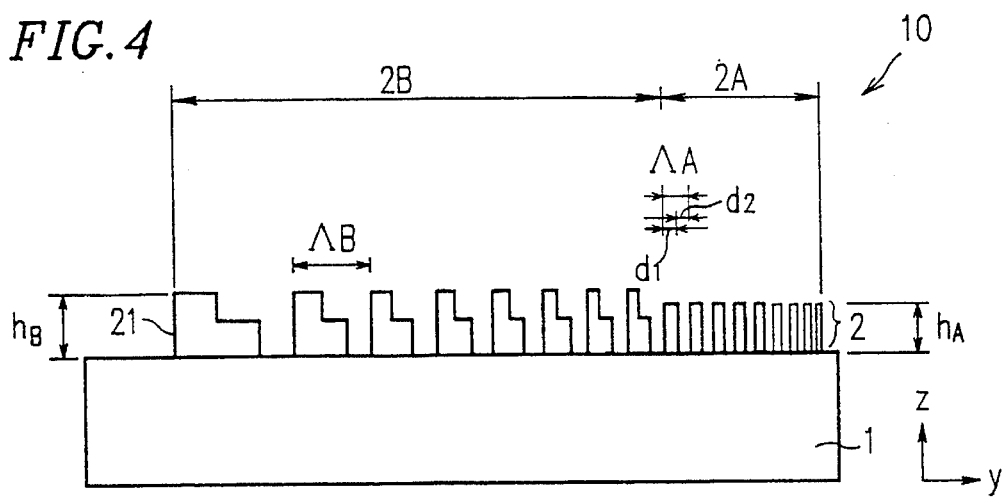
FIG. 4 is a cross sectional view of a diffractive optical device in a first example according to the present invention.
Figure 5:
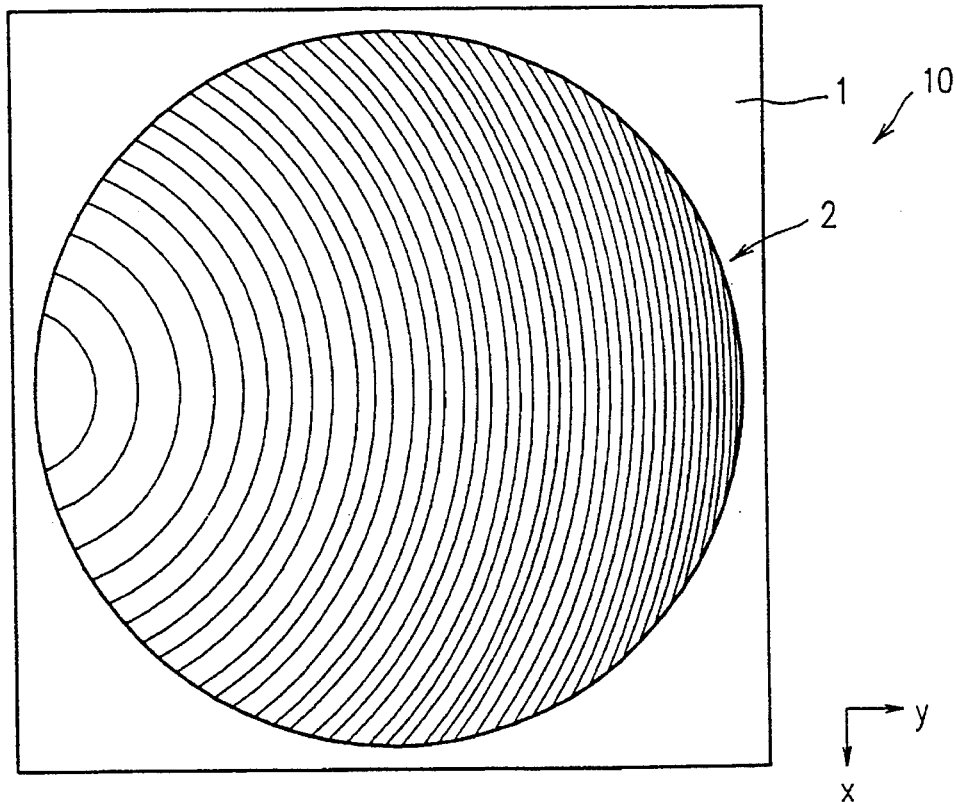
FIG. 5 is a plan view of the diffractive optical device shown in FIG. 4.

Referring to FIGS. 4 through 7, a diffractive optical device 10 in a first example according to the present invention will be described. FIG. 4 is a cross sectional view of the diffractive optical device 10, and FIG. 5 is a plan view thereof.

As is shown in FIGS. 4 and 5, the diffractive optical device 10 includes a substrate 1 and a grating section 2 located on a top surface of the substrate 1. The substrate 1 and the grating section 2 are formed of a material which allows transmission therethrough of light of at least a wavelength to be diffracted (for example, light having a wavelength of 0.6328 μm). The substrate 1 and the grating section 2 may be formed of different materials from each other or may be integrally formed of an identical material.

The grating section 2 includes a plurality of grating elements 21 arranged so as to form a grating pattern. Each grating element 21 has a cross section having a plurality of steps, namely, has multiple phase levels.

Figure 6:
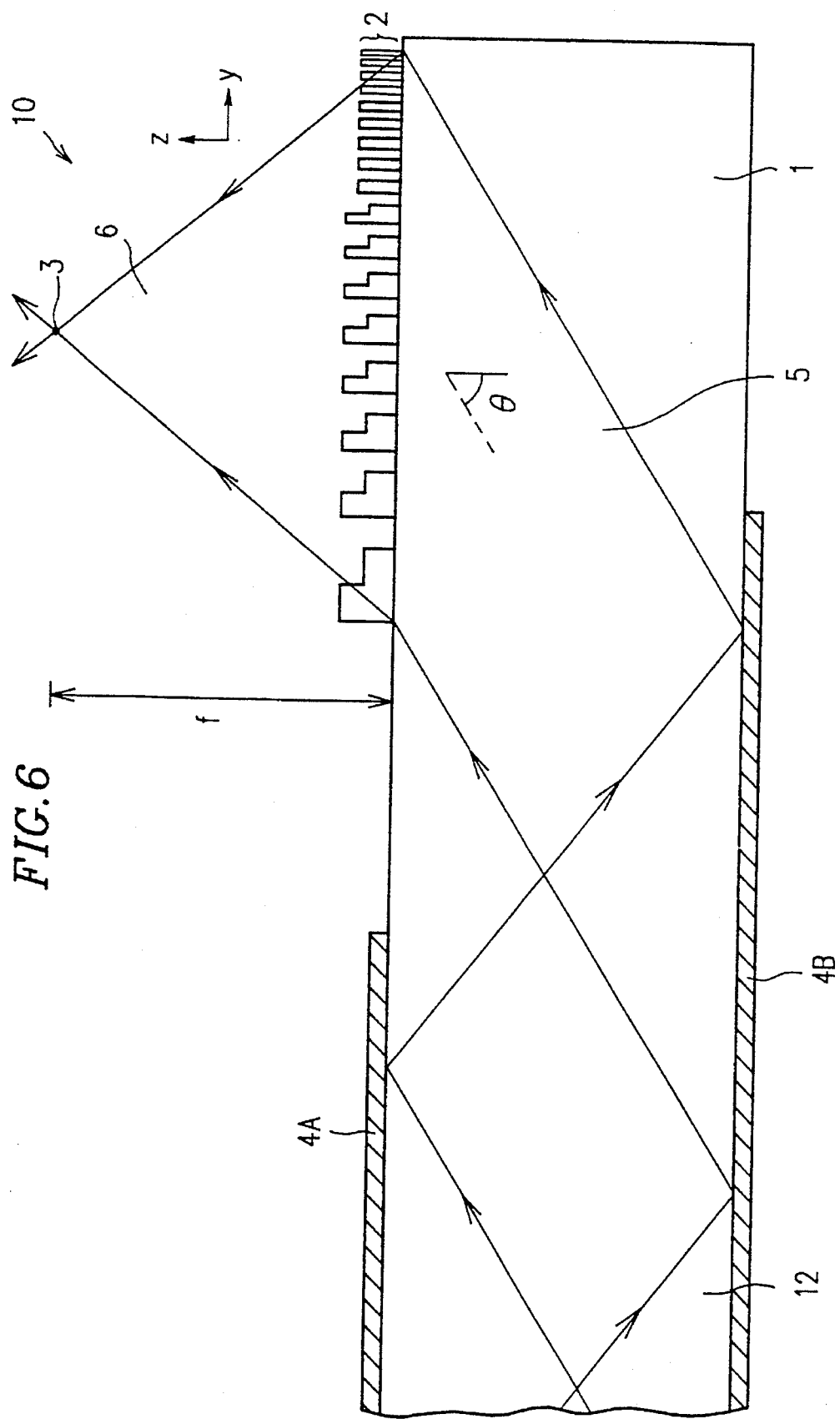
FIG. 6 is a cross sectional view of the diffractive optical device shown in FIG. 4 illustrating how light advances.

The diffractive optical device 10 is used, for example, as an off-axis lens as is shown in FIG. 6. An axis of light incident on an off-axis lens is different from an axis of light outgoing from the off-axis lens. As is shown in FIG. 6, light 5 which is propagated zigzag in a light guide region 12 in the substrate 1 goes out through the top surface of the substrate 1 as outgoing light 6. The light guide region 12 is provided with reflective layers 4A and 4B respectively on a top surface and a bottom surface thereof for reflecting the light 5 alternately in repetition. Thus, the light 5 is propagated zigzag from the negative side to the positive side of axis y and is incident on the grating section 2 at an incident angle of which is offset with respect to the vertical direction to the top surface of the substrate 1. Then, the light 5 is transmitted through the grating section 2 and goes out to above the substrate 1 vertically. Herein, "goes out vertically" means that the axis of the outgoing light 6 is substantially vertical to the top surface of the substrate 1, namely, parallel to axis z. By utilizing a part of the substrate 1 as the light guide region 12, the size of an optical system of the diffractive optical device 10 in the direction of axis z is significantly reduced.

The grating section 2 has a grating pattern as shown in FIG. 5 in order to collect the light 5 incident at an offset angle at point 3 which is away from the top surface of the substrate 1 by distance f. Each grating element 21 forming the grating pattern is arcked while projecting toward the positive direction of axis y. The grating period is progressively reduced and the curvature of the grating elements 21 is progressively increased toward the positive direction of axis y. Such a grating pattern will be described in detail later. At point 3, an optical data recording medium such as an optical disc may be placed. In such a case, at least a part of the outgoing light 6 is reflected by the optical data recording medium and thus returns to the diffractive optical device 10. The light reflected by the optical data recording medium is guided to a light detector. Needless to say, the diffractive optical device 10 can be used for various other uses.

Although one substrate is used in one diffractive optical device in FIG. 6, one substrate may be commonly used for a plurality of diffractive optical devices by providing a plurality of grating sections 2 on the top surface, on a bottom surface, or on both of the top and the bottom surfaces of the substrate 1. Other types of optical devices utilizing no diffraction effect such as a laser light source or a light detector may also be provided on the substrate 1.

As is shown in FIG. 4, the grating section 2 is divided into two areas: area 2A where the grating period is relatively small and area 2B where the grating period is relatively large. The grating period of area 2A is smaller than 1.6 times the wavelength of the incident light, and the grating period of area 2B is at least 1.6 times the wavelength of the incident light. In this example, each grating element 21 in area 2 has three phase levels while each grating element 21 in area 2A has two phase levels. In more detail, each grating element 21 in area 2B includes a first level having a height of 0 from the top surface of the substrate 1, a second level having a height of ½ $h_B$, and a third level having a height of $h_B$. Each grating element 21 in area 2A includes a first level having a height of 0 from the top surface of the substrate 1 and a second level having a height of $h_A$.

According to the experiment performed by the inventors of the present invention, the diffraction efficiency at three phase levels was higher than that at two phase levels in area 2B having a relatively large grating period. In area 2A having a grating period proximate to the wavelength of the incident light, the diffraction efficiency at three phase levels was rapidly reduced; and the diffraction efficiency at two phase levels was reduced at a smaller ratio or even raised.

Figure 7:
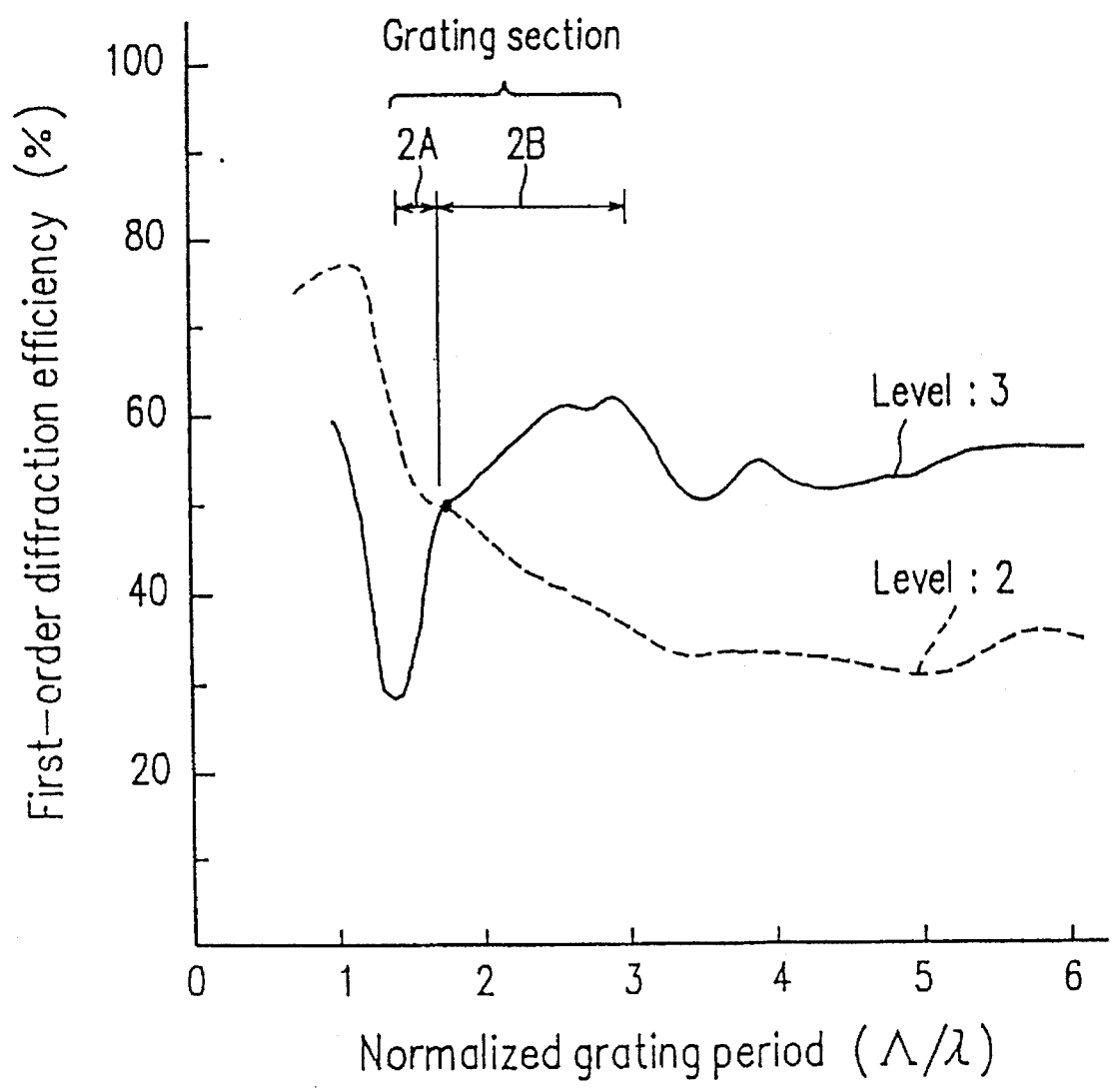
FIG. 7 is a graph illustrating the relationship between the first order diffraction efficiency and the normalized grating period in areas in which grating elements have two and three phase levels in the diffractive optical device shown in FIG. 4.

With reference to FIG. 7, the above-mentioned experiment will be described in detail. FIG. 7 is a graph illustrating the relationship between the normalized grating period $\Lambda/\lambda$ and the diffraction efficiency. Symbol $\Lambda$ denotes the grating period, and symbol $\lambda$ denotes the wavelength Of the light. The experiment was performed under the conditions that the incident angle θ of the light was 20° and the refractive index n of areas 2A and 2B was 1.5. As is indicated by the solid line in FIG. 7, in the case of the grating elements each having three phase levels, the diffraction efficiency is more than 50% in area 2B having a relatively large grating period but is reduced drastically in area 2A where the grating period is proximate to the wavelength of the incident light. As is indicated by the dashed line, in the case of the grating elements each having two phase levels, the diffraction efficiency is 30 to 40% in area 2B but increases as the grating period decreases. Especially from the point at which the grating period is approximately twice or three times the wavelength of the incident light, the diffraction efficiency rapidly increases as the grating period decreases. For example, where the grating period is 1.6 times the wavelength of the incident light, the diffraction efficiency of the grating elements having two phase levels is equal to the diffraction efficiency of the grating elements having three phase levels. Accordingly, for example, by providing the grating elements 21 having three phase levels in an area where the grating period is at least 1.6 times the wavelength of the incident light and providing the grating elements 21 having two phase levels where the grating period is less than 1.6 times the wavelength of the incident light, the diffraction efficiency can be high in the entire diffractive optical device 10.

As is described above, there was a problem conventionally in that precision processing was difficult to perform in an area of a grating period proximate to a wavelength of incident light, and thus it was difficult to shape grating elements having many phase levels in an intended manner, causing deterioration in the optical characteristics. Since it has been found by the inventors of the present invention that the optimum number of phase levels decreases as the grating period decreases. Accordingly, even the diffractive optical devices having an area where the grating period is small can be easily produced. More practically, in a conventional device, the grating elements having three phase levels can be properly produced in an area where the grating period is relatively large, but the grating elements having three phase levels cannot be produced so as to have sharp-edged steps in an area where the grating period is relatively small. In the diffractive optical device 10 in this example, only two phase levels are sufficient for the grating elements 21 in an area where the grating period is less than 1.6 times the wavelength of the incident light. Thus, precision processing is easier and the grating elements 21 can be produced as designed.

In this example, the number of phase levels is changed from two to three at the normalized grating period of 1.6 (namely, when the grating period is 1.6 times the wavelength of the incident light). Although the optimum normalized grating period at which the number of phase levels should be changed is different depending on the incident angle of light and the like, it has been confirmed that substantially the same effects are obtained as long as the number of phase levels is changed at the normalized grating period of between 1.5 and 3.

The other parameters of the diffractive optical device 10 in this example are, for example, as follows: The diameter of a circular opening is 1 mm; the wavelength of the incident light $\lambda$=is 0.6328 μm; the incident angle of light $\theta$=20°; and the focal distance is 2.5 mm. In area 2B where the number of phase levels is three, the grating period is, for example, between 1.0 and 2.0 μm; and the height $h_B$ is, for example, 0.84 μm. In area 2A where the number of phase levels is two, the grating period is, for example, between 0.89 μm and 1.0 μm; and the height $h_A$ is, for example, 0.63 μm. The height of the grating element 21 is changed in accordance with the number of phase levels, in which manner the diffraction efficiency is optimized. In area 2A, the duty ratio d1/ΛA (FIG. 4) is, for example, 0.3. The duty ratio is the ratio of an area occupied by a material other than air with respect to the total area of one grating period in terms of the cross section of the grating section 2.

The grating pattern shown in FIG. 5 will be described in detail. In an x-y coordinate shown in FIG. 5, where the wavelength of the incident light is $\lambda$, the refractive index of the substrate 1 is n and the incident angle of light is $\theta$, the phase shift function is expressed by:

$$\Phi(x, y)=k((x^2+Y^2+f^2)^{1/2}+ny\sin\theta-f)-2 m\pi K=\lambda/2\pi;$$

and m is an integer fulfilling $0 \leq \Phi \leq 2\pi$ and indicates the order of the grating pattern. From such phase shift function, the shape of the arc of the grating section 2 having an order of m is a top part of an ellipse in which the center is expressed by:

$$(0, -n\sin\theta(m\lambda+f)/(1-n^2\sin^2\theta),$$

the length of a minor axis (axis x) is expressed by:

$$d_x=2(m^2\lambda^2+2m\lambda f+n^2f^2\sin^2\theta)^{1/2}/(1-n^2\sin^2\theta)^{1/2},$$

and the length of a major axis (axis y) is expressed by:

$$d_y=d_x/(1-n^2\sin^2\theta)^{1/2}.$$

Needless to say, the grating pattern of a diffractive optical device according to the present invention is not limited to the one shown in FIG. 5, but can be arbitrarily designed in accordance with the use.

The substrate 1 and the grating section 2, which allow transmission therethrough of light to be diffracted are formed of, for example, glass or a synthetic resin. In the case that infrared light is used, the substrate 1 and the grating section 2 may be formed of a semiconductor material such as Si or GaAs.

The diffractive optical device 10 in the first example is produced by an electron beam drawing method. According to this method, the substrate 1 is coated with a synthetic resin such as an electron beam resist (for example, PMMA or CMS) which is sensitive to an electron beam, and an electron beam is radiated to the layer of the synthetic resin. In accordance with the shape of the cross section of the diffractive optical device to be produced, the amount of the electron beam to be radiated is controlled. For example, when a positive resist is used, the electron beam is radiated in a smaller amount to an area which is relatively thick so as to increase the ratio of the thickness remaining after the development with respect to the thickness before development. After the electron beam radiation, the resultant laminate is developed to produce the diffractive optical device 10. A diffractive optical device according to the present invention may be produced with any other specifications suitable for the use.

For the purpose of mass-production, the diffractive optical devices may be produced at a lower cost by forming a mold by a nickel electroforming method and duplicating the mold using a UV curable resin. Especially diffractive optical devices arranged in an array can be produced at a high precision with uniform characteristics at one time in this manner. The grating section 2 formed of a synthetic resin such an electron beam resist may be transferred onto the substrate 1 formed of glass or the like by ion beam etching. In such a case, the diffractive optical device is stable in performance against temperature change.

As is described above, in the case when light is incident at an offset angle with respect to the vertical direction to the surface of the substrate 1, the diffraction efficiency does not necessarily increase as the numbers of phase levels increases in the entire area of the grating section 2. The diffraction efficiency has a peak at different number of phase levels in accordance with the grating period. Accordingly, by setting the number of phase levels of the grating elements to be optimum in accordance with the grating period, the diffraction efficiency can be high in the entire diffractive optical device 10. Moreover, since the optimum number of phase levels tends to decrease as the grating period decreases in an area where the grating period is relatively small, even the grating elements having a small grating period can be easily fabricated.

EXAMPLE 2

Figure 8:
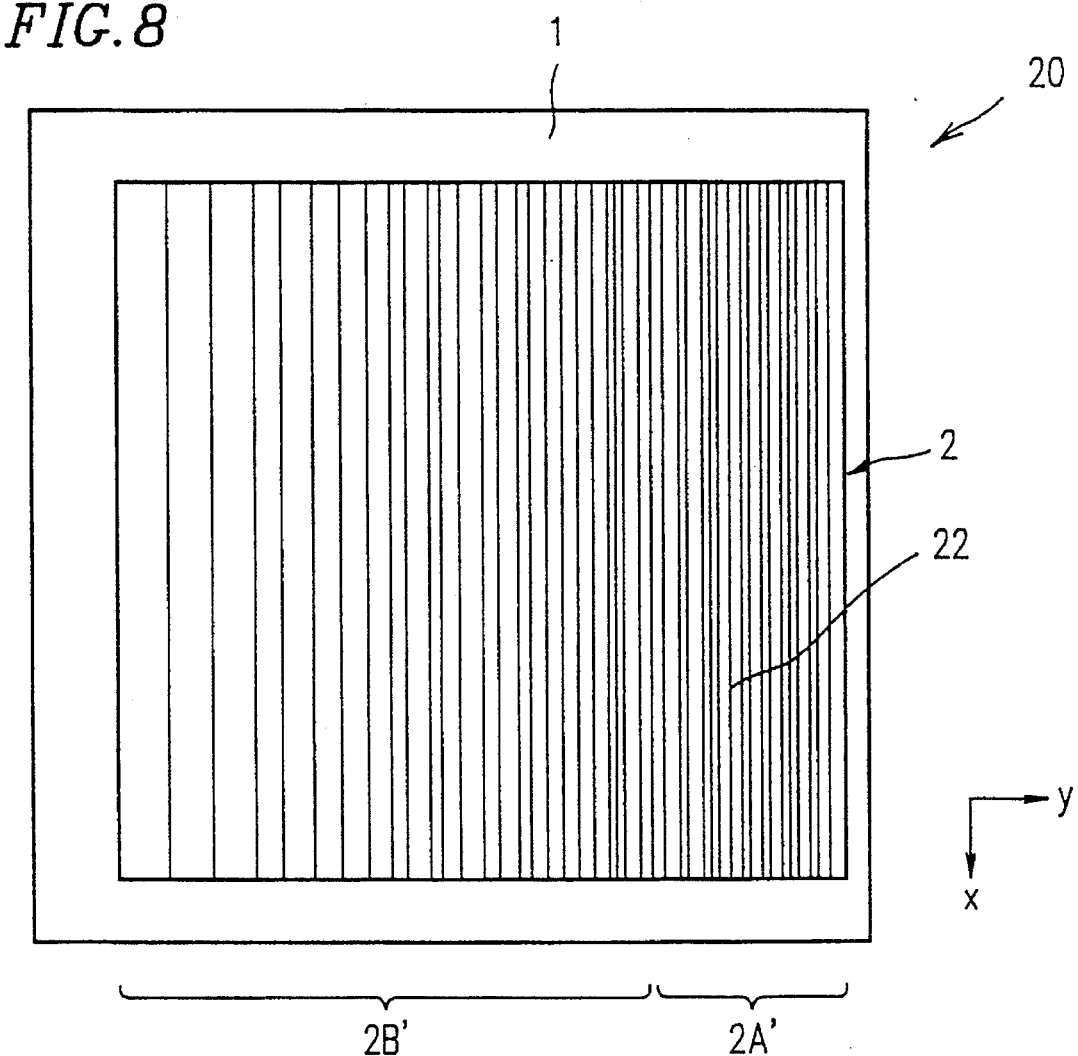
FIG. 8 is a plan view of a diffractive optical device in a second example according to the present invention.

With reference to FIG. 8, a diffractive optical device 20 in a second example according to the present invention will be described. FIG. 8 is a plan view of the diffractive optical device 20. Identical elements with those in the first example will bear identical reference numerals therewith, and explanation thereof will be omitted.

In the second example, grating elements 22 in the grating section 2 provided on the substrate 1 are straight lines in shape extending in the direction of axis x. The grating period changes in the direction of axis y. The diffractive optical device 20 having such grating elements 22 is used as a cylindrical off-axis lens for collecting light incident at an offset angle with respect to the vertical direction to the surface of the substrate 1 only in the direction of one axis. In the example shown in FIG. 8, the light is collected in the direction of axis y.

The diffractive optical device 20 has a similar cross sectional view as that of the diffractive optical device 10 shown in FIG. 4. In the diffractive optical device 20, the same effects as obtained in the first example can be obtained by providing the grating elements 22 having three phase levels in area 2B' where the grating period is relatively large and providing the grating elements 22 having two phase levels in area 2A' where the grating period is relatively small.

EXAMPLE 3

Figure 9:
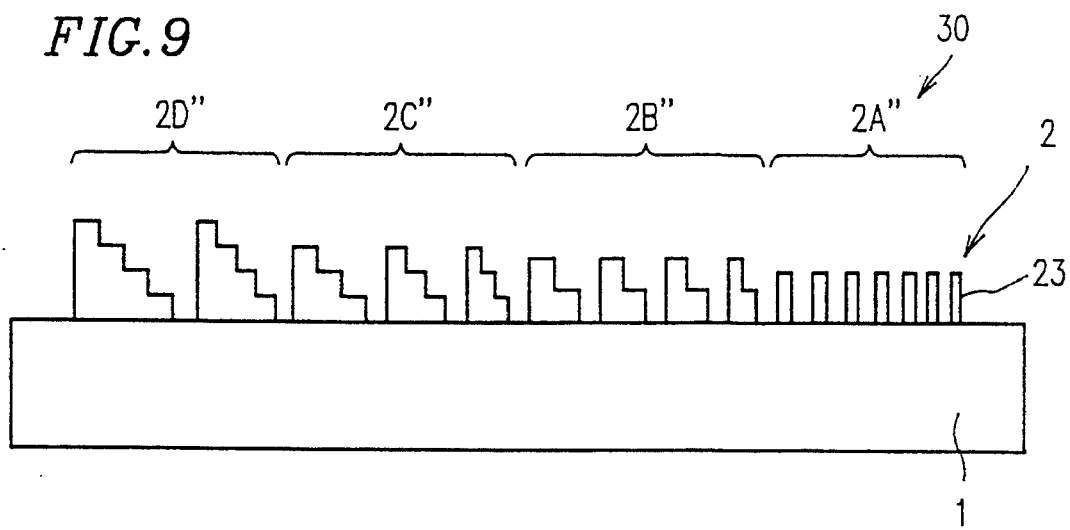
FIG. 9 is a cross sectional view of a diffractive optical device in a third example according to the present invention.
Figure 10:
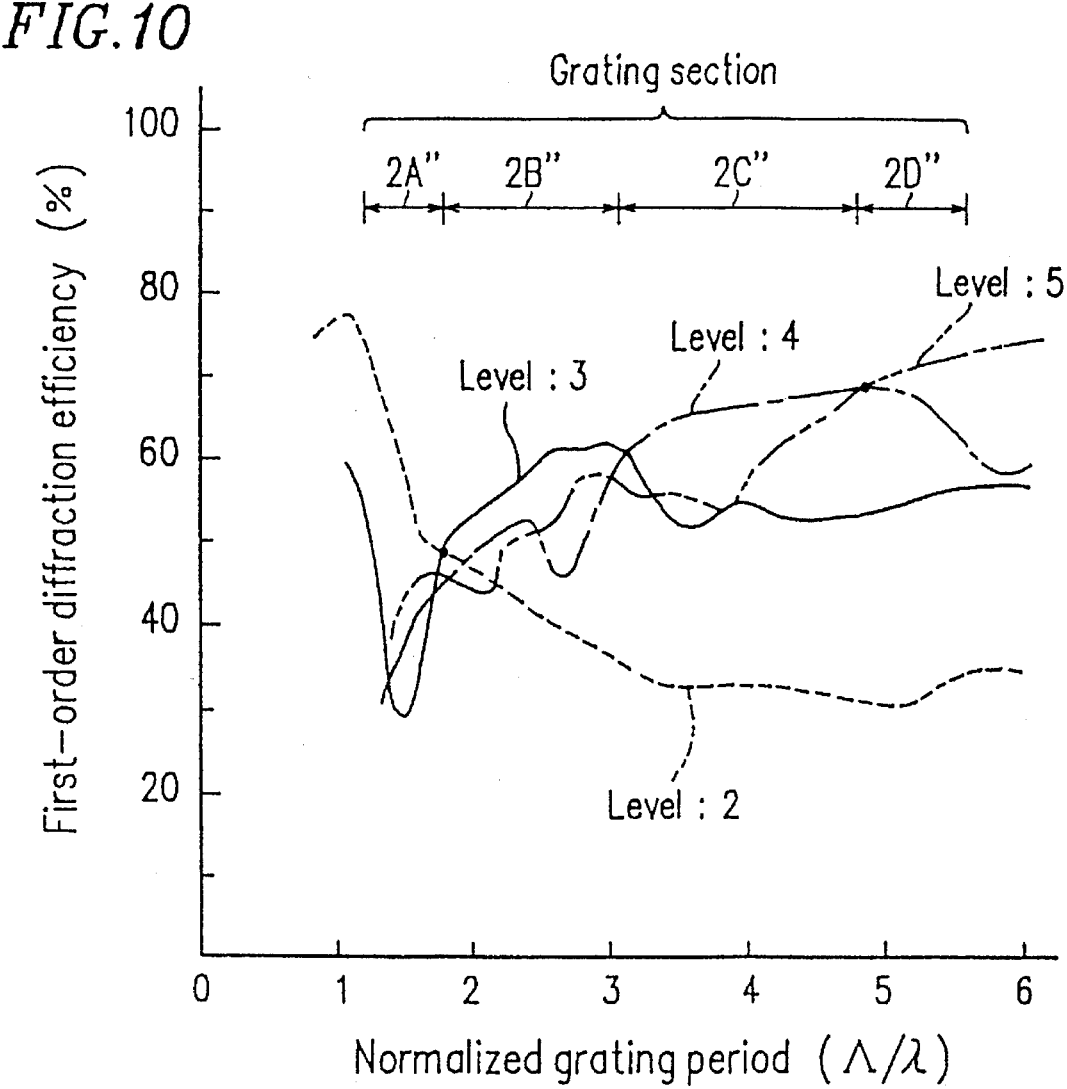
FIG. 10 is a graph illustrating the relationship between the first order diffraction efficiency and the normalized grating period in areas in which grating elements have two through five phase levels in the diffractive optical device shown in FIG. 9 when the incident angle of the light is 20°.
Figure 11:
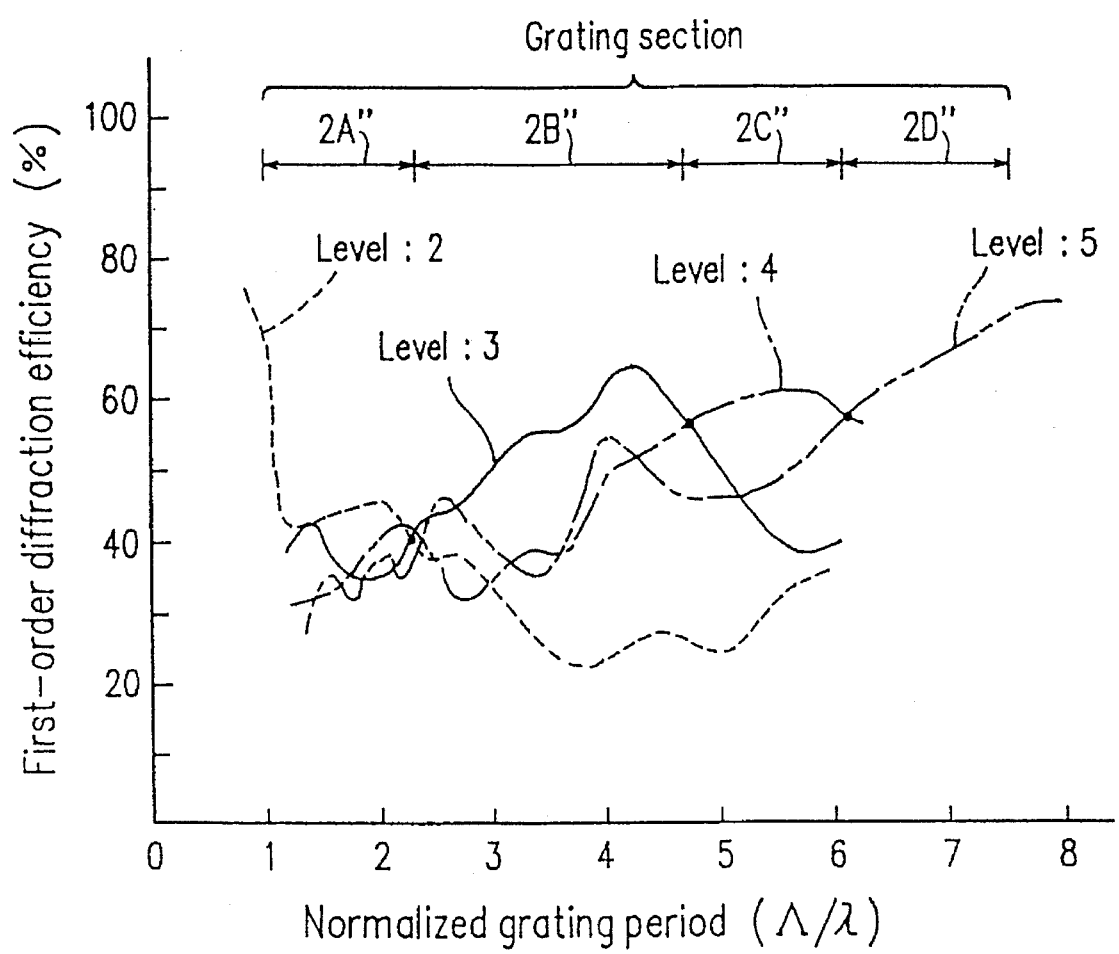
FIG. 11 is a graph illustrating the relationship between the first order diffraction efficiency and the normalized grating period in areas in which grating elements have two through five phase levels in the diffractive optical device shown in FIG. 9 when the incident angle of the light is 30°.

With reference to FIGS. 9 through 11, a diffractive optical device 30 in a third example according to the present invention will be described. FIG. 9 is a cross sectional view illustrating a basic structure of the diffractive optical device 30. FIG. 10 is a graph illustrating the relationship between the normalized grating period and the efficiency of first order diffraction when the incident angle of light is 20°. FIG. 11 is a graph illustrating the relationship between the normalized grating period and the efficiency of first order diffraction when the incident angle of light is 30°. Identical elements with those in the first example will bear identical reference numerals therewith, and explanation thereof will be omitted.

The diffractive optical device 30 is an off-axis lens in which the grating period changes toward one direction. The grating section 2 including grating elements 23 are divided into four areas 2A" through 2D". In area 2D" where the grating period is largest among in the four areas, each grating element 23 has five phase levels. The grating elements 23 each have four phase levels in area 2C" where the grating period is second largest, three phase levels in area 2B" where the grating period is second smallest, and two phase levels in area 2A" where the grating period is smallest among in the four areas.

As is understood from FIG. 10, area 2A" has a normalized grating period of, for example, $1.2 \leq \Lambda/\lambda < 1.6$. Area 2B" has a normalized grating period of, for example, $1.6 \leq \Lambda/\lambda < 3.1$. Area 2C" has a normalized grating period of, for example, $3.1 \leq \Lambda/\lambda < 4.7$. Area 2D" has a normalized grating period of, for example, $4.7 \leq \Lambda/\lambda < 5.5$. The height of each area is, for example, 0.633 μm in area 2A", 0.84 μm in area 2B", 0.95 μm in area 2C", and 1.01 μm in area 2D". The other parameters of the diffractive optical device 30 are, for example, as follows: The diameter of a circular opening is 1 mm the wavelength of the incident light λ=0.6328 μm; and the incident angle of light θ=20° and the refractive index n of areas 2A", 2B", 2C" and 2D" is 1.5. The focal distance is 1.4 mm, which is shorter than that of the off-axis lens 10 in the first example. In an off-axis lens having such a short focal distance, the grating period changes at a higher ratio.

As is shown in FIG. 10, the diffraction efficiency of the grating elements having five phase levels becomes lower than the diffraction efficiency of the grating elements having four phase levels at the normalized grating period of b 4.7. The diffraction efficiency of the grating elements having four phase levels becomes lower than the diffraction efficiency of the grating elements having three phase levels at the normalized grating period of 3.1. Similarly, the diffraction efficiency of the grating elements having three phase levels becomes lower than the diffraction efficiency of the grating elements having two phase levels at the normalized grating period of 1.6. Accordingly, by providing the grating elements 23 having the optimum phase levels for each area, the diffraction efficiency can be high in the entire diffractive optical device 30.

FIG. 11 shows the relationship between the normalized grating period and the efficiency of first order diffraction when the incident angle of light is 30° and the refractive index n of areas 2A", 2B", 2C" and 2D" is 1.5. In the case that the incident angle of light changes, the optimum normalized grating period at which the number of phase levels should be changed is also changed. Nonetheless, the inventors of the present invention have confirmed that the same effects are obtained as long as the number of phase levels is changed from five to four at the normalized grating period of between 4 and 7, from four to three at the normalized grating period of between 2 and 5, and from three to two at the normalized grating period of between 1.5 and 3.

In the above example, an off-axis lens for collecting light incident at an offset angle vertically is described. The present invention provides the same effects in other types of diffractive optical devices in the case that the light is incident at an offset angle.

EXAMPLE 4

Figure 12:
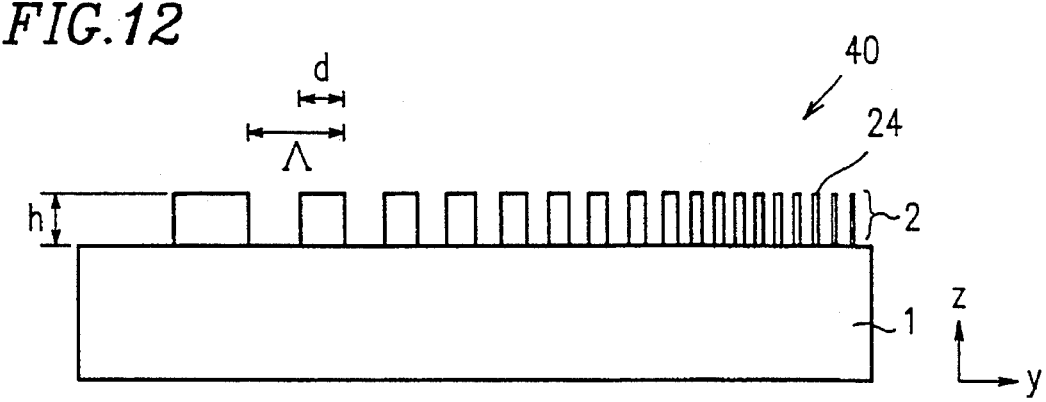
FIG. 12 is a cross sectional view of a diffractive optical device in a fourth example according to the present invention.
Figure 13:
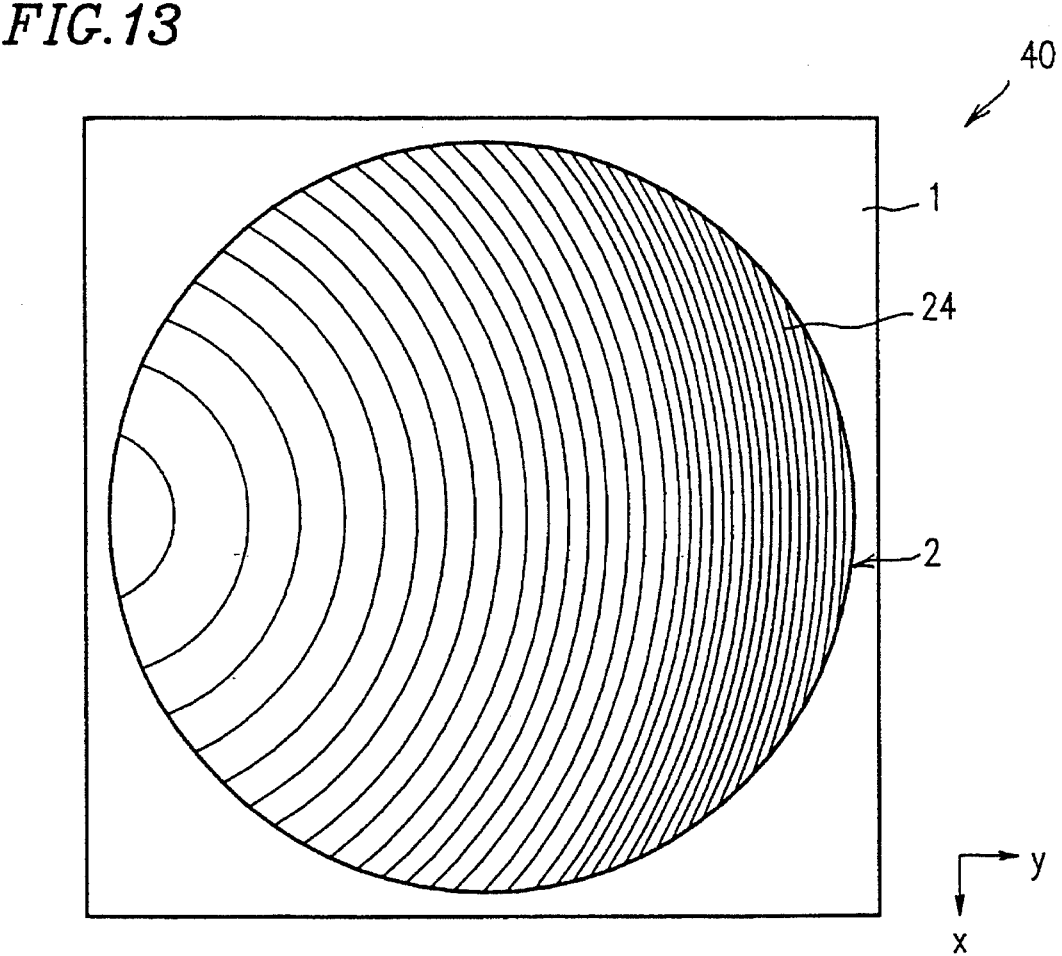
FIG. 13 is a plan view of the diffractive optical device shown in FIG. 12.

With reference to FIGS. 12 through 17, a diffractive optical device 40 in a fourth example according to the present invention will be described. FIG. 12 is a cross sectional view of the diffractive optical device 40, and FIG. 13 is a plan view thereof. Identical elements with those in the first example will bear identical reference numerals therewith, and explanation thereof will be omitted.

As is appreciated from FIGS. 12 and 13, the diffractive optical device 40 has a similar plan view with that of the diffractive optical device 10 in FIG. 5 but has a different cross sectional view from that of the diffractive optical device 10. Grating elements 24 in the grating section 2 each have a rectangular cross sectional view. The duty ratio d/Λ changes in accordance with the grating period. Symbol Λ denotes the grating period, and symbol λ denotes the wavelength of the light. The duty ratio is the ratio of an area occupied by a material other than air with respect to the total area of one grating period in terms of the cross section of the grating section 2.

In the case that the light to be diffracted is transmitted through the substrate 1 to reach the grating section 2, where the wavelength of the light to be diffracted in the vacuum is λ, each grating period Λ is set to be larger than λ/2.

In the case of a reflection type diffractive optical device in which the light to be diffracted is reflected by a reflective layer which is formed over the grating section 2, where the wavelength of the light to be diffracted in the vacuum is λ, and the refractive index of the substrate 1 is n, each grating period Λ is set to be larger than λ/2n.

In the fourth example, the duty ratio is set for 0.5 in an area where the grating period is relatively large and to be reduced in correspondence with decrease in the grating period. (The duty ratio will be described in detail later.) The height h of the grating elements 24 is constant regardless of the grating period. The other parameters of the diffractive optical device 40 are, for example, as follows: The diameter of a circular opening is 1 mm; the wavelength of the incident light λ=0.6328 μm; and the incident angle of light θ=20°. The grating period is, for example, 0,633 μm to 6.3 μm, and the height h of the grating elements 24 is, for example, 0.63 µm.

According to the experiment performed by the inventors of the present invention, when light was incident at an offset angle with respect to the vertical direction to the top surface of the substrate 1, the diffraction efficiency was highest at the duty ratio of approximately 0.5 in an area having a relatively large grating period. The inventors have found that the diffraction efficiency increases as the duty ratio decreases in an area where the grating period is proximate to the wavelength of the incident light. The experiment will be described in detail, hereinafter.

Figure 14:
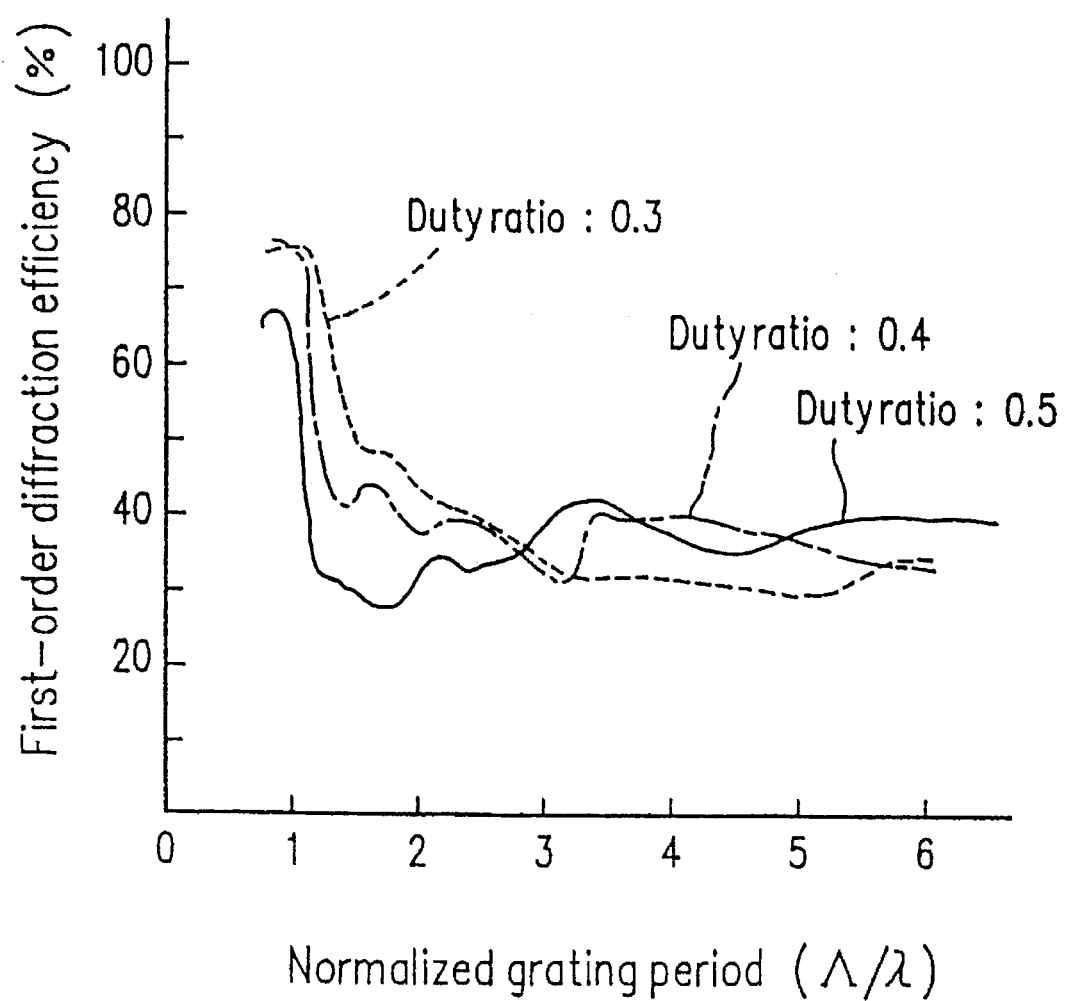
FIG. 14 is a graph illustrating the relationship between the first order diffraction efficiency and the normalized grating period in areas in which duty ratios are 0.3, 0.4 and 0.5 in the diffractive optical device shown in FIG. 12 when the incident angle of the light is 20°.

FIG. 14 illustrates the relationship between the normalized grating period and the efficiency of first order diffraction when the incident angle of light is 20° and the refractive index of the grating section 2 is 1.5. As is indicated by the solid line in FIG. 14, when the duty ratio is 0.5, the diffraction efficiency is approximately 40% in an area where the grating period is relatively large, but is reduced in an area where the normalized grating period is as small as 3. When the duty ratio is 0.4 (chain line) and 0.3 (dashed line), the diffraction efficiency is lower than that in the case when the duty ratio is 0.5 in an area where the grating period is relatively large, but is higher than that in the case when the duty ratio is 0.5 in an area where the grating period is relatively small.

Figure 15:
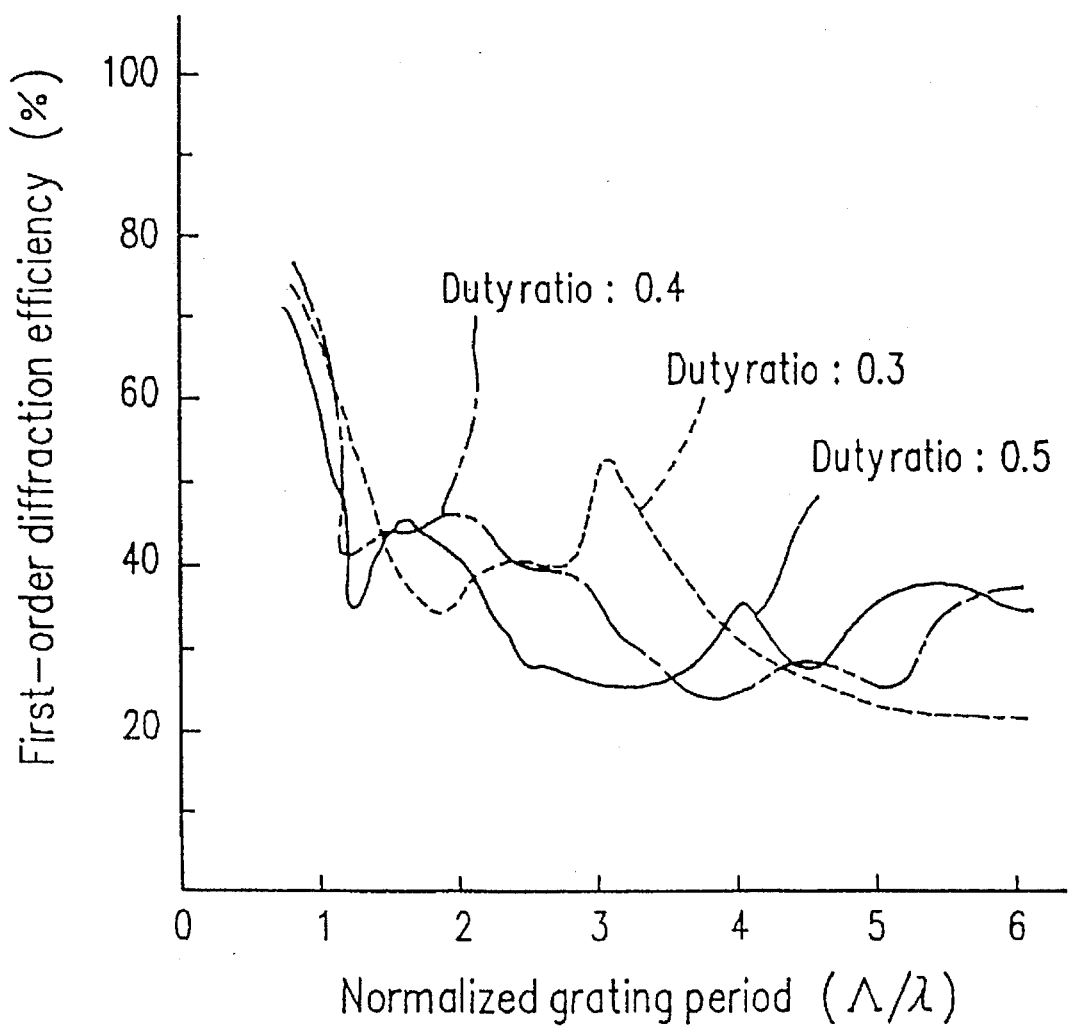
FIG. 15 is a graph illustrating the relationship between the first order diffraction efficiency and the normalized grating period in areas in which duty ratios are 0.3, 0.4 and 0.5 in the diffractive optical device shown in FIG. 12 when the incident angle of the light is 30°.

FIG. 15 illustrates the relationship between the normalized grating period and the efficiency of first order diffraction when the incident angle of light is 30° and the refractive index n is 1.5. The results are substantially the same as those shown in FIG. 14, namely, the diffraction efficiency has a peak at different duty ratios in accordance with the grating period.

Accordingly, by changing the duty ratio in accordance with the grating period, the diffraction efficiency can be high in the entire diffractive optical device 40.

Figure 16:
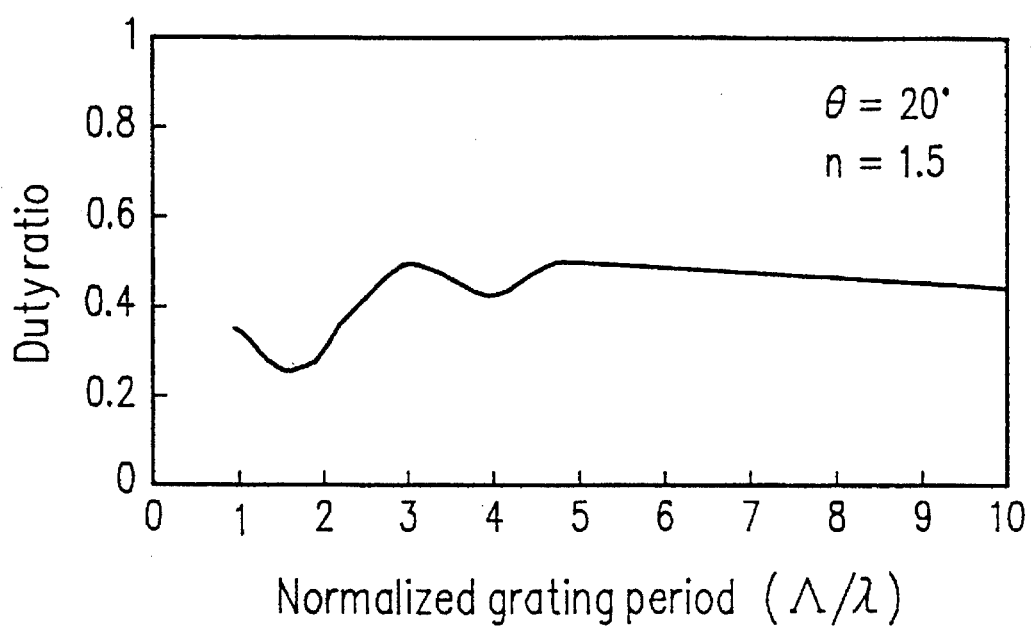
FIG. 16 is a graph illustrating the relationship between the duty ratio and the normalized grating period with respect to the diffractive optical device shown in FIG. 12 when the incident angle of the light is 20°.

In this example, the duty ratio is set as shown in FIG. 16 in relation with the grating period. The duty ratio is 0.45 to 0.5 in an area where the grating period is relatively large, and the duty ratio is changed as shown in FIG. 16 in an area where the grating period is relatively small. The curve indicating the optimum duty ratio depends on various conditions. The duty ratio is desirably less than 0.5 in an area where the normalized grating period is smaller than 3 to 4. In general, the diffraction efficiency is improved by gradually reducing the duty ratio in correspondence with decrease in the grating period.

Figure 17:
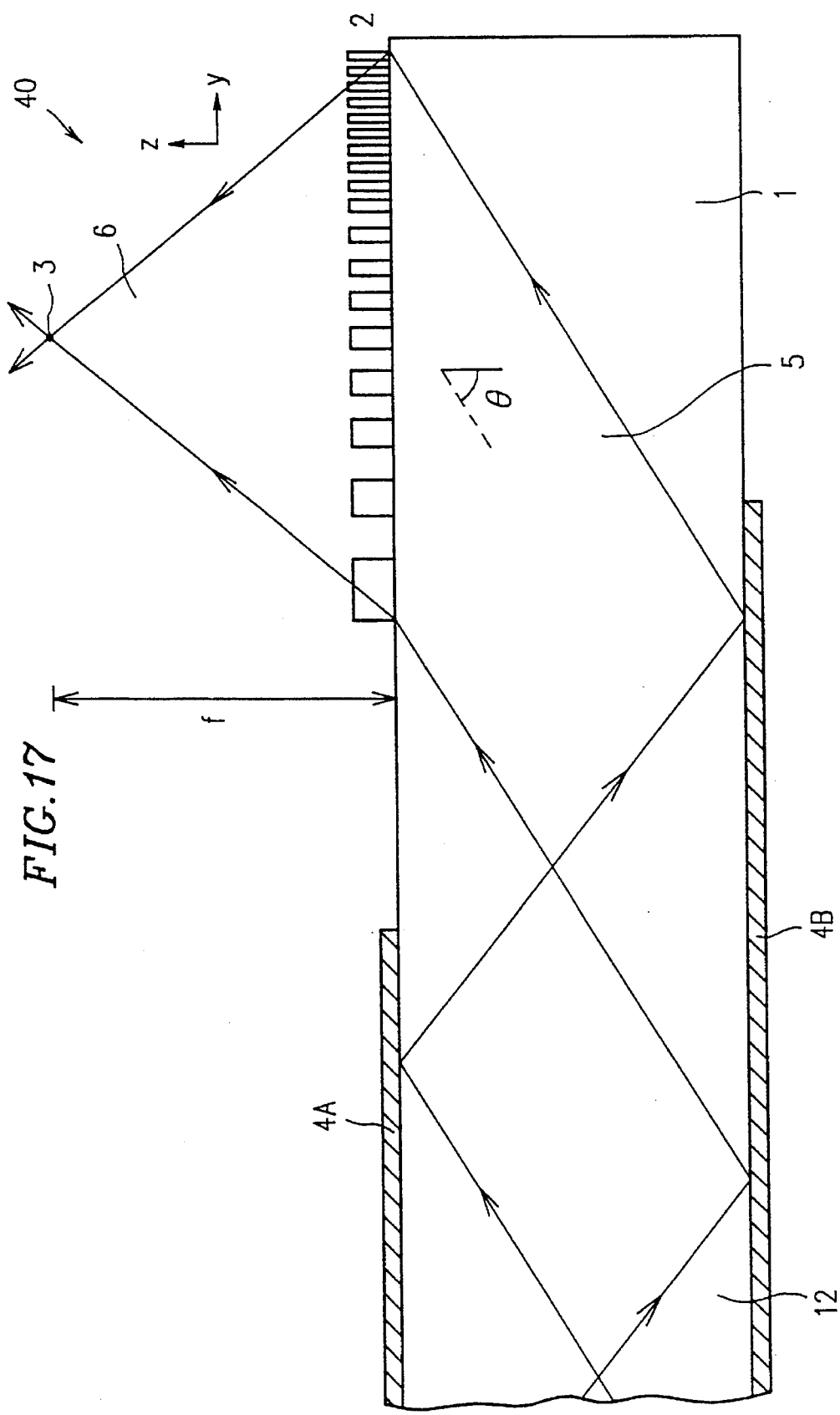
FIG. 17 is a cross sectional view of the diffractive optical device shown in FIG. 12 illustrating how light advances.

As is shown in FIG. 17, the diffractive optical device 40 is used as an off-axis lens. As is shown in FIG. 17, the light 5 which is propagated zigzag in the light guide region 12 in the substrate 1 goes out through the top surface of the substrate 1 as outgoing light 6. The light guide region 12 is provided with the reflective layers 4A and 4B respectively on the top surface and the bottom surface thereof for reflecting the light 5 alternately in repetition. Thus, the light 5 is propagated zigzag and finally goes out above the substrate 1 vertically.

As is shown in FIG. 13, the grating pattern is symmetrical with respect to the center thereof, and arcked toward one direction. The grating period gradually decreases and the curvature of the grating elements 24 increases toward such a direction.

The materials for each component of the diffractive optical device 40 and a method for producing the same are identical with those described in the first example, and explanation thereof will be omitted.

EXAMPLE 5

Figure 18:
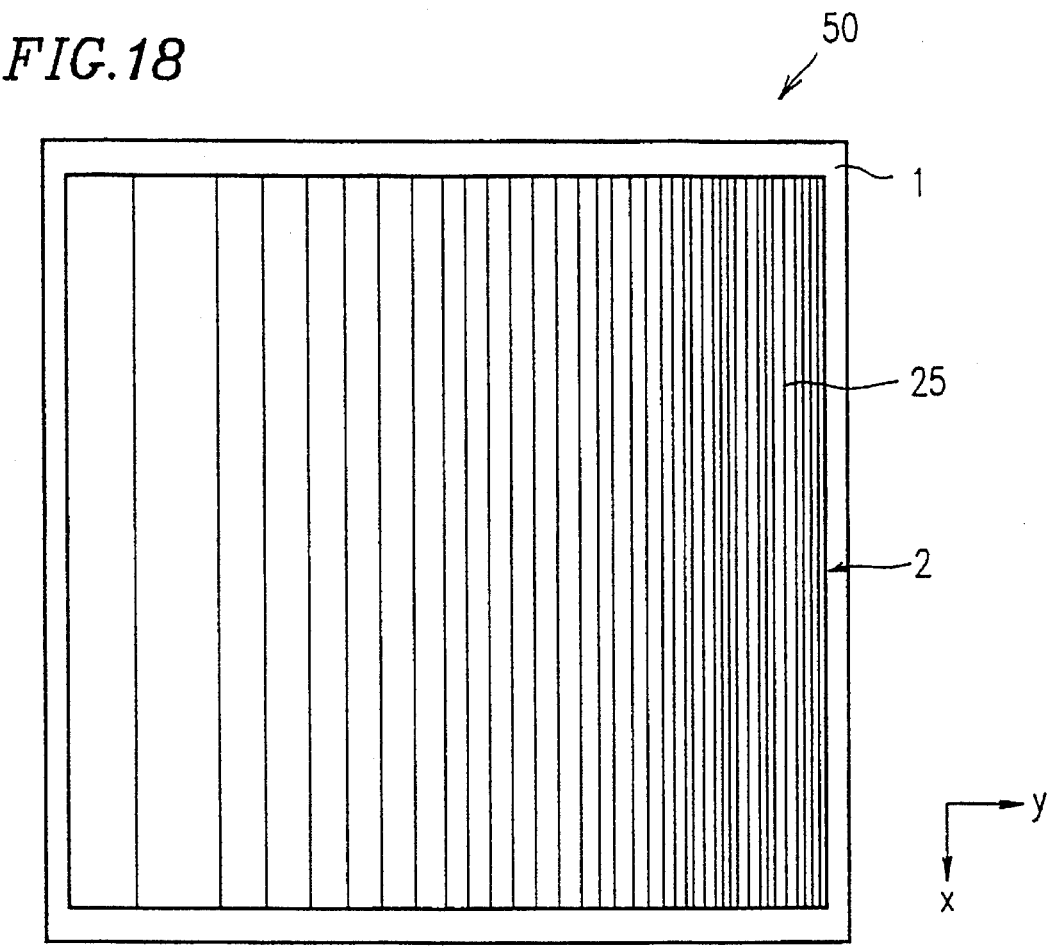
FIG. 18 is a plan view of a diffractive optical device in a fifth example according to the present invention.

With reference to FIG. 18, a diffractive optical device 50 in a fifth example according to the present invention will be described. FIG. 18 is a plan view of the diffractive optical device 50. Identical elements with those in the fourth example will bear identical reference numerals therewith, and explanation thereof will be omitted.

In the fifth example, grating elements 25 in the grating section 2 provided on the substrate 1 are straight lines in shape extending in the direction of axis x. The grating period changes in the direction of axis y. The diffractive optical device 50 having such grating elements 25 is used as a cylindrical off-axis lens for collecting light incident at an offset angle with respect to the vertical direction to the surface of the substrate 1 only in the direction of one axis. In the example shown in FIG. 18, the light is collected in the direction of axis y.

The diffractive optical device 50 has a similar cross sectional view as that of the diffractive optical device 40 shown in FIG. 12. In the diffractive optical device 50, the same effects as obtained in the fourth example such as improvement in the diffraction efficiency can be obtained by changing the duty ratio in the same manner as in the fourth example.

Figure 19:
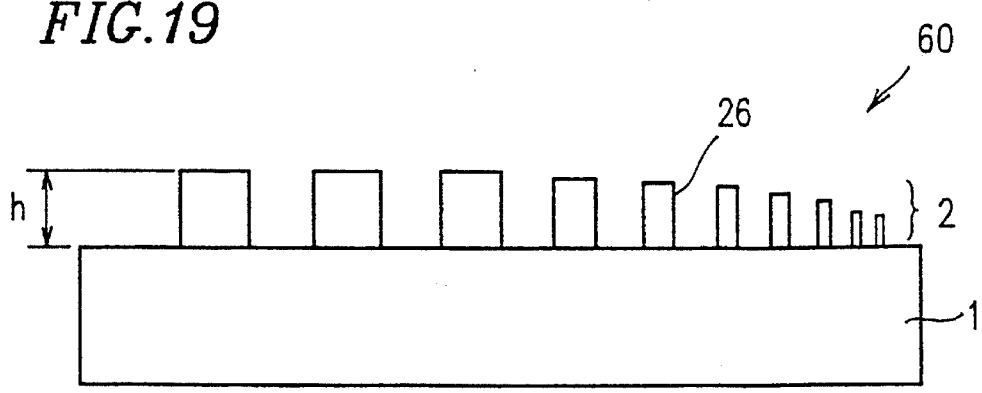
FIG. 19 is a cross sectional view of a diffractive optical device in a sixth example according to the present invention.
Figure 20:
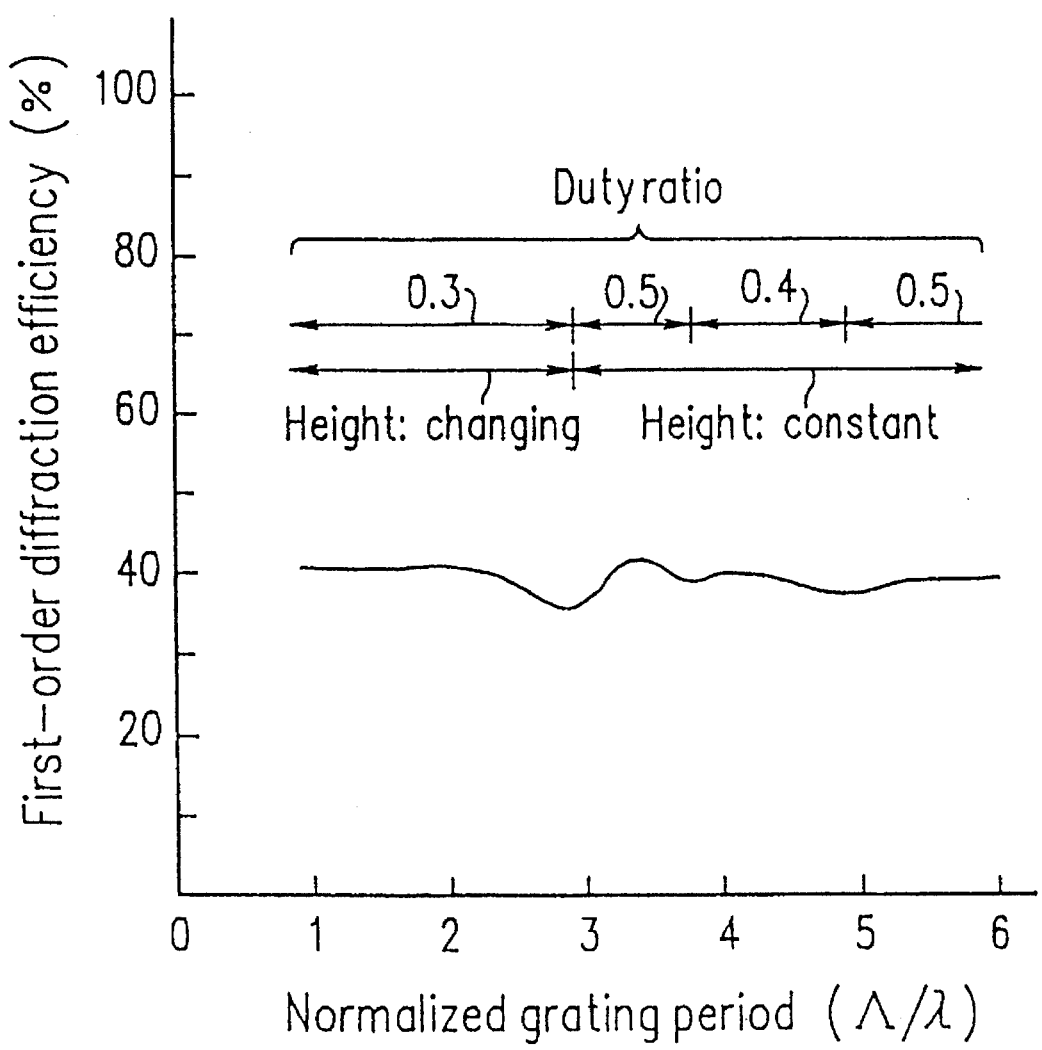
FIG. 20 is a graph illustrating the relationship between the efficiency of first order diffraction and the normalized grating period in areas having different duty ratios and different heights in the diffractive optical device shown in FIG. 19.

EXAMPLE 6 with reference to FIGS. 19 and 20, a diffractive optical device 60 in a sixth example according to the present invention will be described. FIG. 19 is a cross sectional view of the diffractive optical device 60, and FIG. 20 is a graph illustrating the relationship between the normalized grating period and the efficiency of first order diffraction when the incident angle of light is 20° and the refractive index n is 1.5. Identical elements with those in the fourth example will bear identical reference numerals therewith, and explanation thereof will be omitted.

As is shown in FIG. 19, grating elements 26 in the grating section 2 are arranged with different duty ratios as well as with different heights. As is shown in FIG. 20, in an area where the normalized grating period is 3 or more, the grating elements 26 have an identical height. In an area where the grating period is less than 3, the height of the grating elements 26 is changed so as to have substantially a uniform diffraction efficiency. Although the curve indicating the optimum height depends on the various conditions, the height is desirably changed in an area where the normalized grating period is less than 3 to 4.

In general, the diffraction efficiency is improved by reducing the height of the grating elements 26 in correspondence with decrease in the grating period. In this example, the duty ratio and the height of the grating elements 26 are changed in accordance with the grating period so as to prevent deterioration in the diffraction efficiency even in an area where the grating period is small. Accordingly, the diffraction efficiency is substantially uniform in the entire diffractive optical device 60. As a result, light distribution in a spot where the light is collected can be constant.

In the above examples, the diffractive optical devices are each an off-axis lens for collecting the light vertically, the light being incident at an offset angle with respect to the vertical direction to the surface of the substrate 1. The present invention provides the same effects in various other diffractive optical devices in the case when the light is incident at an offset angle.

In the first through the third examples, the duty ratio may be changed in accordance with the grating period in an area where the number of the phase levels is two.

Figure 21:
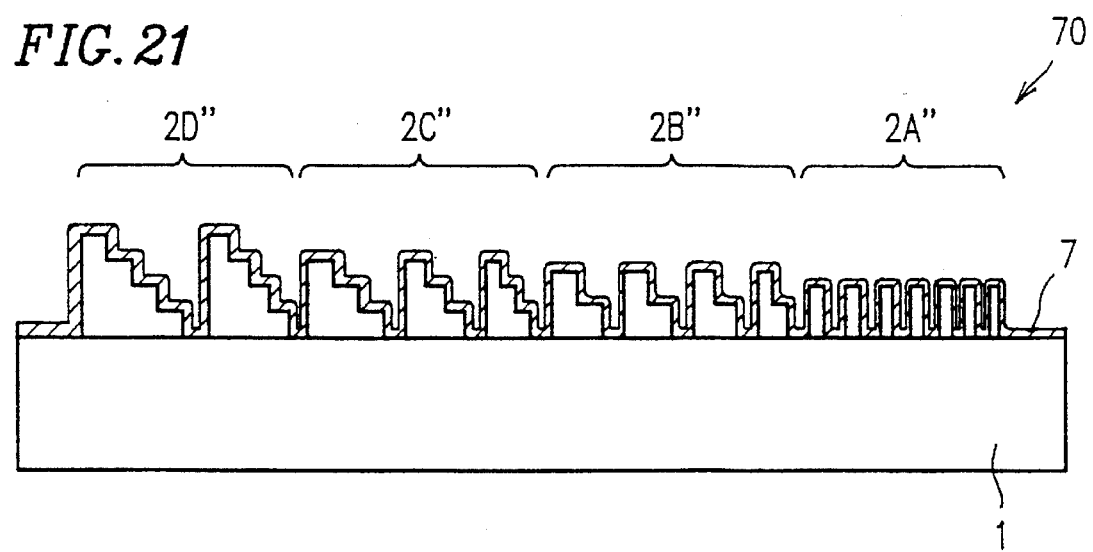
FIG. 21 is cross sectional view of a diffractive optical device in a modification according to the present invention having a reflective film.

In the above examples, the diffractive optical devices of a transmission type are described. The present invention is also applicable to reflection type devices having a reflective film provided on the grating section 2. FIG. 21 is a cross sectional view of such a reflection type diffractive optical device 70 provided with a reflective film 7. As the reflective film 7, the one used in a conventional diffractive optical device may be used.

Films other than the reflective film, for example, a non-reflective film such as a protective thin film or a thin film for preventing reflection may be used instead of the reflective film 7. The thin film for preventing reflection is used in a transmission type device.

Figure 22:
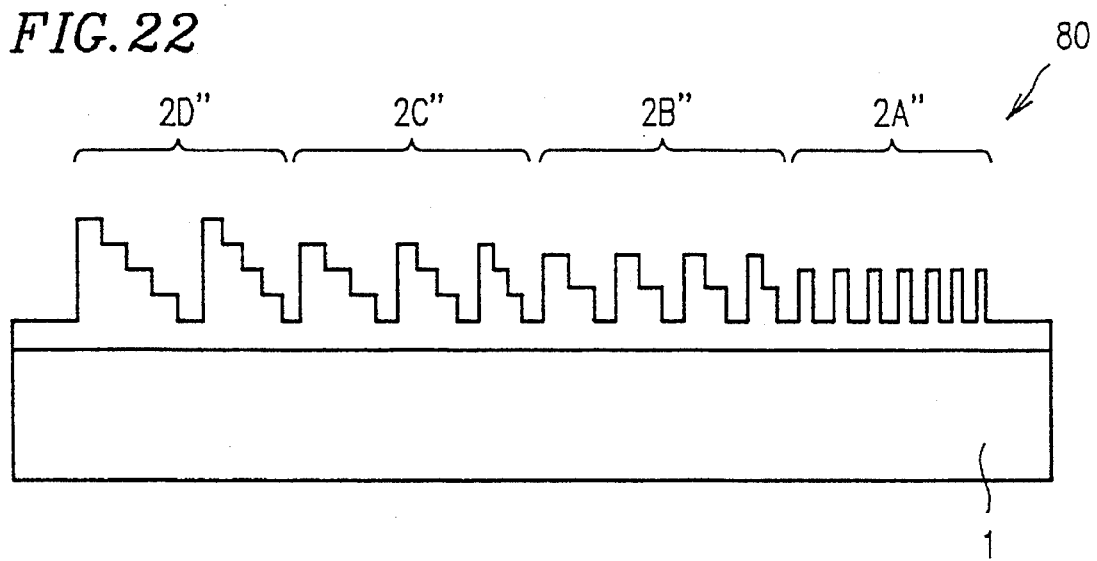
FIG. 22 is a cross sectional view of a diffractive optical device in another modification according to the present invention having a plurality of grating elements connected together at the bottom thereof.

The grating elements are separated from one another in the above examples, but may be connected together at the bottom thereof. FIG. 22 is a cross sectional view of such a diffractive optical device 80. The top surface of the substrate 1 is not exposed.

Figure 23:
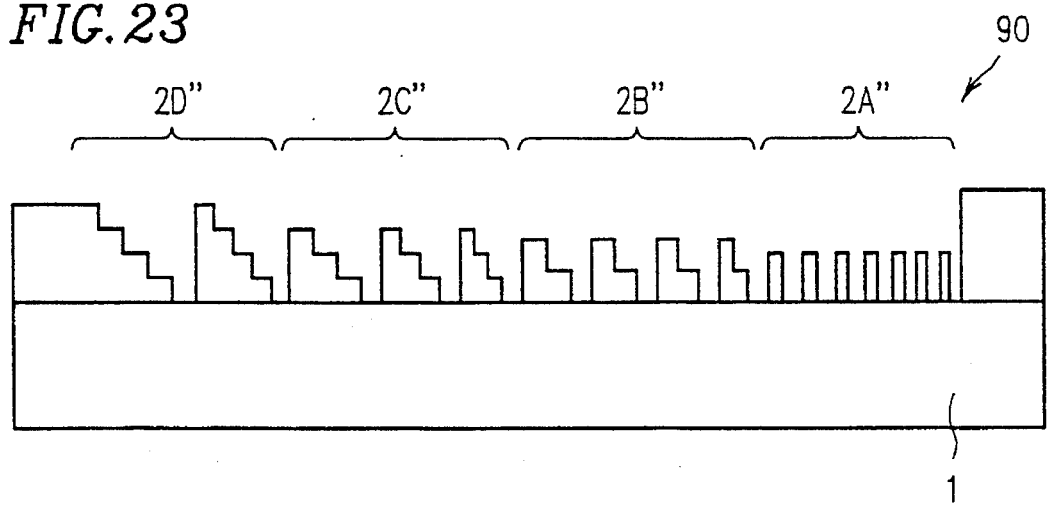
FIG. 23 is a cross sectional view of a diffractive optical device in still another modification according to the present invention having a plurality of grating elements formed using a positive resist.

FIG. 23 is a cross sectional view of a diffractive optical device 90 having a grating pattern formed using a positive resist. The shape of grating elements substantially contributing to diffraction is the same whether a negative or a positive resist is used.

According to the present invention, as has been described so far, the number of the phase levels changes in accordance with the grating period. By such a structure, the diffraction efficiency is improved in the entire device, especially for light incident at an offset angle with respect to the vertical direction to the top surface of the substrate. By reducing the optimum number of phase levels in accordance with decrease in the grating period, the grating elements are easily produced even in an area where the grating period is relatively small.

In the case when the grating elements each have a rectangular cross section, the duty ratio regarding each cross section is set to be optimum in accordance with the grating period. In this manner, the diffraction efficiency of the light incident at an offset angle is improved even in an area where the grating period is relatively small. Further, by changing the height of the grating elements as well as the duty ratio in accordance with the grating period, the diffraction efficiency can be uniform in the entire device. As a result, light distribution in a spot where the light is collected can be constant.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A diffractive optical device, comprising:
   a substrate for allowing transmission therethrough of light to be diffracted; and
   a grating section located on the substrate and including a plurality of grating elements each having multiple discrete phase levels arranged in a disposition plane in a grating pattern which collects light incident at an offset angle with respect to a direction normal to the disposition plane, the plurality of grating elements including;
      a first plurality of grating elements having a first phase level, the first plurality having a first grating period which results in a first diffraction efficiency with said light being incident at said offset angle, and
      a second plurality of grating elements having a second phase level different from the first phase level, said second plurality having a second grating period which results in a second diffraction efficiency with said light being incident at said offset angle, said second diffraction efficiency being equal to said first diffraction efficiency at a given period
   said first plurality arranged such that said first grating period is smaller than said given period, and said second plurality arranged such that said second grating period is larger than said given period.

2. A diffractive optical device according to claim 1, wherein the number of the phase levels becomes progressively smaller as the grating period decreases.

3. A diffractive optical device according to claim 2, wherein:
   the number of the phase levels is at least 3 in an area where the grating period is at least a first value obtained by multiplying a wavelength of the light by a first prescribed number,
   the number of the phase levels is 2 in an area where the grating period is less than the first value, and
   the first prescribed number is substantially between 1.5 and 3.

4. A diffractive optical device according to claim 3, wherein:
   the grating section has a duty ratio of substantially between 0.15 and 0.5 in the area where the grating period is less than the first value.

5. A diffractive optical device according to claim 3, wherein:
   the number of the phase levels is at least 4 in an area where the grating period is at least a second value obtained by multiplying the wavelength of the light by a second prescribed number,
   the number of the phase levels is 3 in an area where the grating period is smaller than the second value and at least the first value, and
   the second value is substantially between 2 and 5 and greater than the first prescribed number.

6. A diffractive optical device according to claim 5, wherein:
   the number of the phase levels is at least 5 in an area where the grating period is at least a third value obtained by multiplying the wavelength of the light by a third prescribed number,
   the number of the phase levels is 4 in an area where the grating period is smaller than the third value and at least the second value, and
   the third value is substantially between 4 and 7 and greater than the second prescribed number.

7. A diffractive optical device according to claim 1, wherein the grating elements have different heights in accordance with the number of the phase levels thereof.

8. A diffractive optical device according to claim 1, wherein the bottommost level among the multiple discrete phase levels is the surface of the substrate.

9. A diffractive optical device according to claim 1, wherein the smallest grating period is greater than ½n of the wavelength of the light where n is the refractive index of the substrate, and the duty ratio of the grating section changes as a function of the grating periods.

10. A diffractive optical device according to claim 1, wherein the grating elements are symmetrically arranged with respect to the center thereof and are arcked in an identical direction, and the grating period becomes progressively smaller in the direction.

11. A diffractive optical device according to claim 1, wherein the plurality of grating elements are extended in straight lines in an identical direction, and the grating period changes in a direction which is perpendicular to the direction in which the grating elements are extended.

12. A diffractive optical device according to claim 1, wherein the grating section is covered with a thin film.

13. A diffractive optical device according to claim 12, wherein the thin film is reflective.

14. A diffractive optical device according to claim 12, wherein the thin film is anti-reflective.

15. A diffractive optical device according to claim 1, wherein the substrate includes a light guide region for propagating the light.

16. A diffractive optical device according to claim 1, wherein the first phase level is smaller than the second phase level.

17. A diffractive optical device comprising;
a substrate for allowing transmission therethrough of light to be diffracted; and
a grating section located on the substrate and including a plurality of grating elements arranged in a disposition plane inn grating pattern having grating periods which collects light incident at an offset angle with respect to a direction normal to the disposition plane, the plurality of grating elements having different heights which changes as a function of the grating periods with the smallest grating period being greater than ½n of the wavelength of said light where n is the refractive index of the substrate, said plurality including:
a first plurality of grating elements having a first duty ratio, the first plurality having a first grating period which results in a first diffraction efficiency with said light being incident at said offset angle, and
a second plurality of grating elements having a second duty ratio different from the first duty ratio, said second plurality having a second grating period which results in a second diffraction efficiency with said light being incident at said offset angle, said second diffraction efficiency being equal to said first diffraction efficiency at a given period,
said first plurality arranged such that said first grating period is smaller than said given period, and said second plurality arranged such that said second grating period is larger than said given period.

18. A diffractive optical device according to claim 17, wherein the height of the plurality of grating elements becomes progressively smaller in accordance with decrease in the grating period in an area where the grating period is less than three to four times the wavelength of the light.

19. A diffractive optical device, comprising:
a substrate for allowing transmission therethrough of light to be diffracted; and
a grating section located on the substrate and including a plurality of grating elements arranged in a disposition plane in a grating pattern having grating periods which collects light incident at an offset angle with respect to a direction normal to the disposition plane with the smallest grating period being greater than ½n of the wavelength of the light where n is the refractive index of the substrate and wherein a part of the plurality of grating elements each have at least three discrete phase levels, the plurality of grating elements including:
a first plurality of grating elements having a first duty ratio, the first plurality having a first grating period which results in a first diffraction efficiency with said light being incident at said offset angle, and
a second plurality of grating elements having a second duty ratio different from the first duty ratio, said second plurality having a second grating period which results in a second diffraction efficiency with said light being incident at said offset angle, said second diffraction efficiency being equal to said first diffraction efficiency at a given period,
said first plurality arranged such that said first grating period is smaller than said given period, and said second plurality arranged such that said second grating period is larger than said given period.

* * * * *

UNITED STATES PATENT AND TRADE MARK OFFICE
CERTIFICATE OF CORRECTION

PATENT NO.   : 5,561,558
DATED        : October 1, 1996
INVENTOR(S)  : Teruhiro Shiono et al.

It is certified that error appears in the above-identified patent and that said Letters Patent is hereby corrected as shown below:

Column 14, claim 1, line 9, after "period" insert --,--.

Column 15, claim 17, line 26, after "plane" delete "inn" and insert --in a--.

Signed and Sealed this

Fourteenth Day of January, 1997

Attest:

BRUCE LEHMAN

*Attesting Officer*         *Commissioner of Patents and Trademarks*